US 9,552,245 B1

(12) United States Patent
Sharma et al.

(10) Patent No.: US 9,552,245 B1
(45) Date of Patent: Jan. 24, 2017

(54) RESOLVING ERRORS THAT ARISE WHILE ACCESSING ONLINE USER ACCOUNTS

(71) Applicant: INTUIT INC., Mountain View, CA (US)

(72) Inventors: Jaya Sharma, Bangalore (IN); Vinay B. V. Murthy, Bangalore (IN); Grace Pariante, Palo Alto, CA (US); Mukeshkumar M. Dama, Bangalore (IN)

(73) Assignee: INTUIT INC., Mountain View, CA (US)

( * ) Notice: Subject to any disclaimer, the term of this patent is extended or adjusted under 35 U.S.C. 154(b) by 130 days.

(21) Appl. No.: 14/526,296

(22) Filed: Oct. 28, 2014

(51) Int. Cl.
*G06F 11/00* (2006.01)
*G06F 11/07* (2006.01)
*G06Q 40/02* (2012.01)

(52) U.S. Cl.
CPC ....... *G06F 11/0769* (2013.01); *G06F 11/0709* (2013.01); *G06Q 40/02* (2013.01)

(58) Field of Classification Search
CPC .. H04L 63/08; H04L 63/0853; H04L 63/0861; H04L 63/105; G06F 21/33; G06F 21/335; G06F 2221/2113; G06F 2221/2117; G06F 2221/0704; G06F 2221/2141; G06F 21/41; G06F 21/10
See application file for complete search history.

(56) References Cited

U.S. PATENT DOCUMENTS

| 7,233,927 | B1 * | 6/2007 | Norton | G06F 21/33 705/67 |
| 8,505,085 | B2 * | 8/2013 | Logan | G06F 21/33 726/9 |
| 8,553,564 | B2 * | 10/2013 | Matsumoto | G06F 21/305 370/241 |
| 9,077,710 | B1 * | 7/2015 | Levner | H04L 63/083 |
| 9,141,823 | B2 * | 9/2015 | Dawson | G06F 21/6227 |
| 2013/0238894 | A1 * | 9/2013 | Ferg | H04L 9/321 713/155 |
| 2014/0189839 | A1 * | 7/2014 | Jezek | H04L 63/0815 726/8 |

* cited by examiner

*Primary Examiner* — Nadeem Iqbal
(74) *Attorney, Agent, or Firm* — Patterson + Sheridan, LLP (57) ABSTRACT

The disclosed embodiments provide a system that manages access to an online user account. During operation, the system uses stored authentication credentials for a user to access the online user account of the user. Next, the system aggregates financial data for the user from the online user account. Upon detecting an error associated with aggregating the financial data, the system obtains error information describing the error from a web page associated with the error. Next, when the user subsequently accesses the aggregated financial data, the system displays the error information to the user to facilitate resolution of the error by the user.

20 Claims, 9 Drawing Sheets

RESOLVING ERRORS THAT ARISE WHILE ACCESSING ONLINE USER ACCOUNTS

BACKGROUND

Related Art

The disclosed embodiments relate to techniques for managing access to online user accounts. More specifically, the disclosed embodiments relate to techniques for streamlining the process of resolving errors while accessing online user accounts.

User accounts with web-based applications are typically accessed through a computing device with network connectivity. For example, a user may use a laptop computer or mobile phone to access data and features provided by a web application. Furthermore, access to a user account is typically granted only after valid authentication credentials are provided by the user. For example, the user may be required to input a valid username and password to a web application before the user is allowed to access application features or associated data.

After a user is granted access to an account, the user often interacts with an associated flow to perform tasks associated with the user account. For example, the user may navigate through a series of web pages for an online banking account to retrieve an account statement, transfer funds, or pay a bill. The user may also link the online banking account to a separate accounting application that aggregates financial data from the online banking account (and possibly other financial accounts belonging to the user). To aggregate this financial data, the accounting application may first need to obtain authentication credentials from the user, and then use the authentication credentials to access the financial accounts. During this process, the accounting application may use predefined flows to navigate to web pages containing the financial data.

However, changes in a flow associated with a user account may interfere with the process of aggregating data for the user account. Continuing with the above example, the accounting application may be unable to aggregate financial data from the online banking account if the sequence of web pages used to access the financial data has changed. In this case, the user may have to manually navigate through the web pages of the online banking account to identify and resolve the issue. Moreover, the accounting application may report a generic error that lacks adequate information for the user to effectively resolve the issue. Instead, the user may have to report the issue to a customer care center, which increases support costs and may require a lengthy interaction between the user and the customer care center before the issue is resolved.

Consequently, access to user accounts may be facilitated by developing techniques for streamlining the process of resolving errors associated with accessing user accounts.

SUMMARY

Online user accounts may be created through a web-based user interface from network-enabled devices such as personal computers, laptop computers, tablet computers and mobile phones. For example, an online user account may be created by obtaining authentication credentials (e.g., a username and password) from a user through a registration interface for the online user account. The user may also provide the authentication credentials to a data-management system that aggregates data associated with the online user account and other online user accounts belonging to the user. The user may then access one or more visualizations of the aggregated data, perform one or more tasks using the aggregated data, and otherwise process the aggregated data. For example, the user may use the aggregated data to create a budget, track finances and spending, perform payroll, or schedule payments and transfers.

The data-management system may also include functionality that streamlines the process of resolving errors associated with the user account. For example, the data-management system may be unable to aggregate data from the online user account if the online user account cannot be accessed, or requires the user to update his/her authentication credentials, accept new terms of service, or view an advertisement before proceeding to the online user account.

To reduce the manual user action required to resolve such errors, the data-management system may automatically obtain error information from a user account and then provide the error information to the user when the user subsequently attempts to access the aggregated data. For example, the data-management system may display a web page from the website of the online user account that contains the error information to help the user diagnose the error.

The data-management system may also perform one or more actions on behalf of the user to facilitate resolution of an error. For example, the data-management system may automatically navigate the user to the web page containing the error information to allow the user to resolve the error within the web page. Similarly, the data-management system may identify an error code associated with the error and provide a suggested user action for resolving the error based on the error code. Finally, the data-management system may obtain data for performing the suggested user action from the user and then use the data to automatically resolve the error on the user's behalf.

Hence, the disclosed embodiments provide a system that manages access to an online user account. During operation, the system uses stored authentication credentials for a user to access the online user account of the user. Next, the system aggregates financial data for the user from the online user account. Upon detecting an error associated with aggregating the financial data, the system obtains error information describing the error from a web page associated with the error. Next, when the user subsequently accesses the aggregated financial data, the system displays the error information to the user to facilitate resolution of the error by the user.

In some embodiments, the system uses the stored authentication credentials to automatically navigate the user to the web page.

In some embodiments, the system analyzes the error information to determine an error code associated with the error. Next, the system provides, to the user, a suggested user action for resolving the error based on the error code.

In some embodiments, the system obtains, from the user, data for performing the suggested user action, and uses the obtained data to automatically resolve the error on behalf of the user.

In some embodiments, the system includes the data in the stored authentication credentials to facilitate subsequent access to the online user account using the stored authentication credentials.

In some embodiments, the system provides the aggregated financial data to one or more offerings that perform tasks using the aggregated financial data, wherein the one or more offerings are used by the user to access the aggregated financial data.

In some embodiments, the error can be an authentication error, a connectivity error, a user flow error, and/or a financial data mismatch error.

In some embodiments, aggregating the financial data from the online user account includes scraping the financial data from one or more web pages obtained during access to the online user account.

In some embodiments, the financial data is aggregated independently of access to the aggregated financial data by the user.

In some embodiments, the error information is displayed within a screenshot of the web page to the user.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Online user accounts may be created through a web-based user interface from network-enabled devices such as personal computers, laptop computers, tablet computers, mobile phones, and/or portable media players. Such online user accounts may be created using authentication credentials obtained from users through the web-based user interface. For example, an online user account may be created by obtaining a username and password from a user through one or more web pages provided by a registration interface for the online user account.

The user may also provide the authentication credentials to a data-management system that aggregates data associated with the online user account and other online user accounts belonging to the user. The user may then view one or more visualizations of the data, perform one or more tasks using the data, and/or otherwise process the data. For example, the user may use aggregated financial data to create a budget, track finances and spending, perform payroll, and/or schedule payments and transfers.

The data-management system may also include functionality to streamline the resolution of errors associated with the online user account. Such errors may result from changes in the user flow used to aggregate data from the online user account. For example, the data-management system may be unable to aggregate data from the online user account if the online user account cannot be reached or requires the user to update his/her authentication credentials, accept new terms of service, or view an advertisement before proceeding to the online user account. To reduce the manual user action required to resolve the errors, the data-management system may obtain error information associated with the errors and provide the error information to the user when the user attempts to access the aggregated data. For example, the data-management system may display a web page from the website of the online user account that contains the error information to help the user diagnose the error.

The data-management system may also perform one or more actions on behalf of the user to facilitate resolution of an error. For example, the data-management system may automatically navigate the user to the web page containing the error information to allow the user to resolve the error within the web page. Similarly, the data-management system may identify an error code associated with the error and provide a suggested user action for resolving the error based on the error code. Finally, the data-management system may obtain data for performing the suggested user action from the user and then use the data to automatically resolve the error on the user's behalf.

Figure 1:
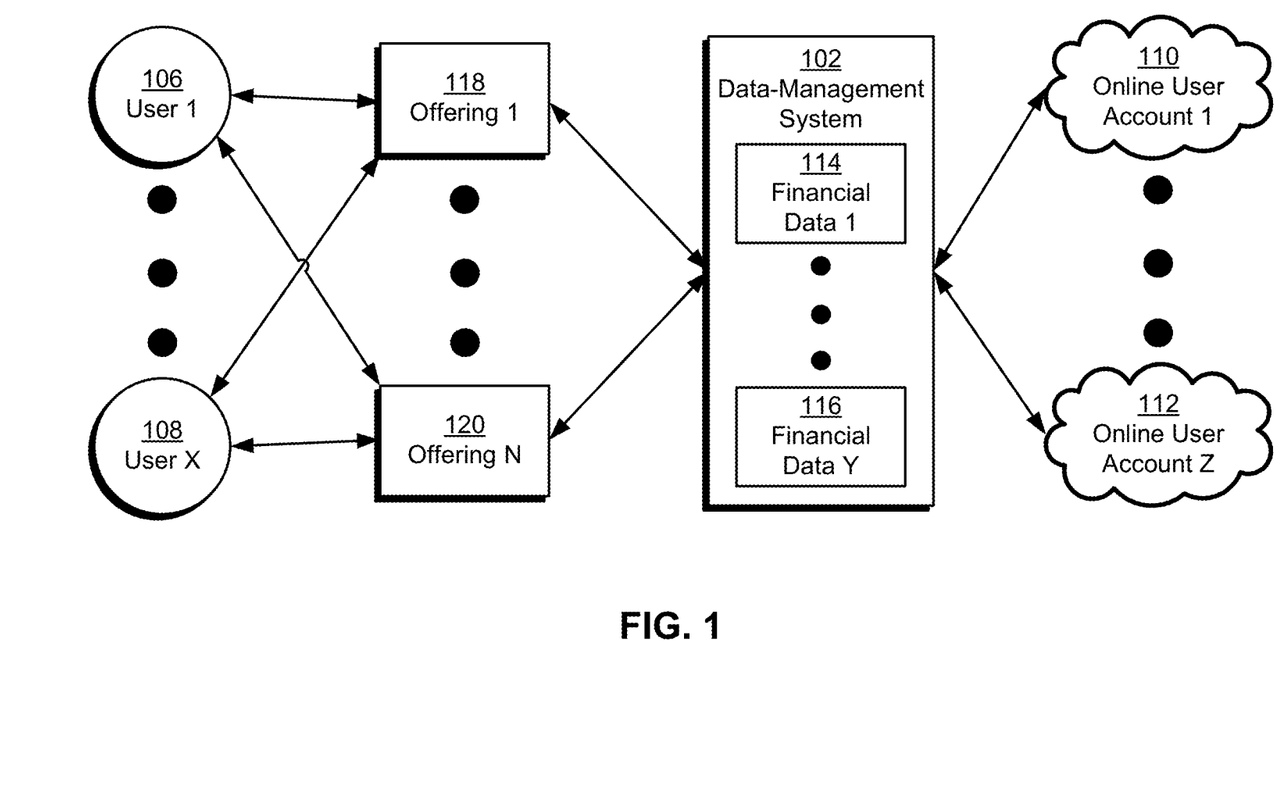
FIG. 1 shows a schematic of a system in accordance with the disclosed embodiments.

FIG. 1 shows a schematic of a system in accordance with the disclosed embodiments. The system includes a data-management system 102 that interacts with a number of online user accounts (e.g., online user account 1 110, online user account z 112) and a number of offerings (e.g., offering 1 118, offering n 120).

Data-management system 102 may aggregate financial data (e.g., financial data 1 114, financial data y 116) associated with the online user accounts and provide the financial data to the offerings. A set of users (e.g., user 1 106, user x 108) may use the offerings to access, store, and/or manipulate the financial data. For example, data-management system 102 may aggregate the financial data from online banking accounts of the users. The aggregated financial data may include bills, invoices, receipts, tax forms, statements, financial accounts, paychecks, and/or financial documents of the users. The offerings may obtain the aggregated financial data from data-management system 102 and display the financial data to the users. The offerings may also allow the users to perform tasks related to the financial data, such as generating payroll, tracking inventory, managing invoices, managing finances, creating a budget, filing taxes, paying bills, tracking financial transactions, and/or generating reports.

As a result, data-management system 102 may provide a centralized mechanism for aggregating financial data from online user accounts with various financial institutions and/or other providers of financial data. The financial data may then be used by a number of software offerings related to financial management and/or accounting, such as tax-preparation applications, small-business accounting applications, and/or personal financial management applications.

To obtain the financial data, data-management system 102 may interface with financial institutions, government agencies, merchants, employers, and/or other providers of financial data. For example, data-management system 102 may communicate with the providers over one or more networks, such as local area networks (LANs), wide area networks (WANs), personal area networks (PANs), virtual private networks, intranets, cellular networks, Wi-Fi (Wi-Fi® is a registered trademark of Wi-Fi Alliance) networks, Bluetooth (Bluetooth® is a registered trademark of Bluetooth SIG, Inc.) networks, universal serial bus (USB) networks, and/or Ethernet networks. During communication with the providers, data-management system 102 may use web services and/or other network-based services to log in to the online user accounts and obtain financial data from the online user accounts. For example, data-management system 102 may obtain authentication credentials for the online user accounts from the users, access the online user accounts using the authentication credentials, and use predetermined user flows with the providers to navigate to web pages containing the financial data and scrape the financial data from the web pages.

Those skilled in the art will appreciate that data-management system 102 may be unable to aggregate financial data from an online user account if the user flow associated with the online user account has changed. For example, data-management system 102 may be unable to reach the financial data in an online banking account if the online banking account requires the user of the online banking account to verify his/her email address, accept new terms and conditions, update the authentication credentials for the online banking account, and/or perform other interaction with the online banking account. Data-management system 102 may also encounter problems with aggregating financial data if the authentication credentials are invalid and/or attributes of the financial data, such as account names, account numbers, and/or account types, have changed.

In one or more embodiments, data-management system 102 includes functionality to streamline the resolution of errors associated with aggregating financial data from online user accounts. As described in further detail below with respect to FIG. 2, data-management system 102 may obtain error information describing the errors from web pages associated with the errors. Data-management system 102 may display the errors to the users during access to the aggregated data through one or more offerings to facilitate resolution of the errors by the users. Data-management system 102 may also automatically navigate the users to the web pages, provide suggested user actions for resolving the errors, obtain data for performing the suggested user actions, and/or use the data to automatically resolve the errors on behalf of the users. As a result, data-management system 102 may reduce overhead associated with resolving data-aggregation errors encountered while accessing the online user accounts.

Figure 2:
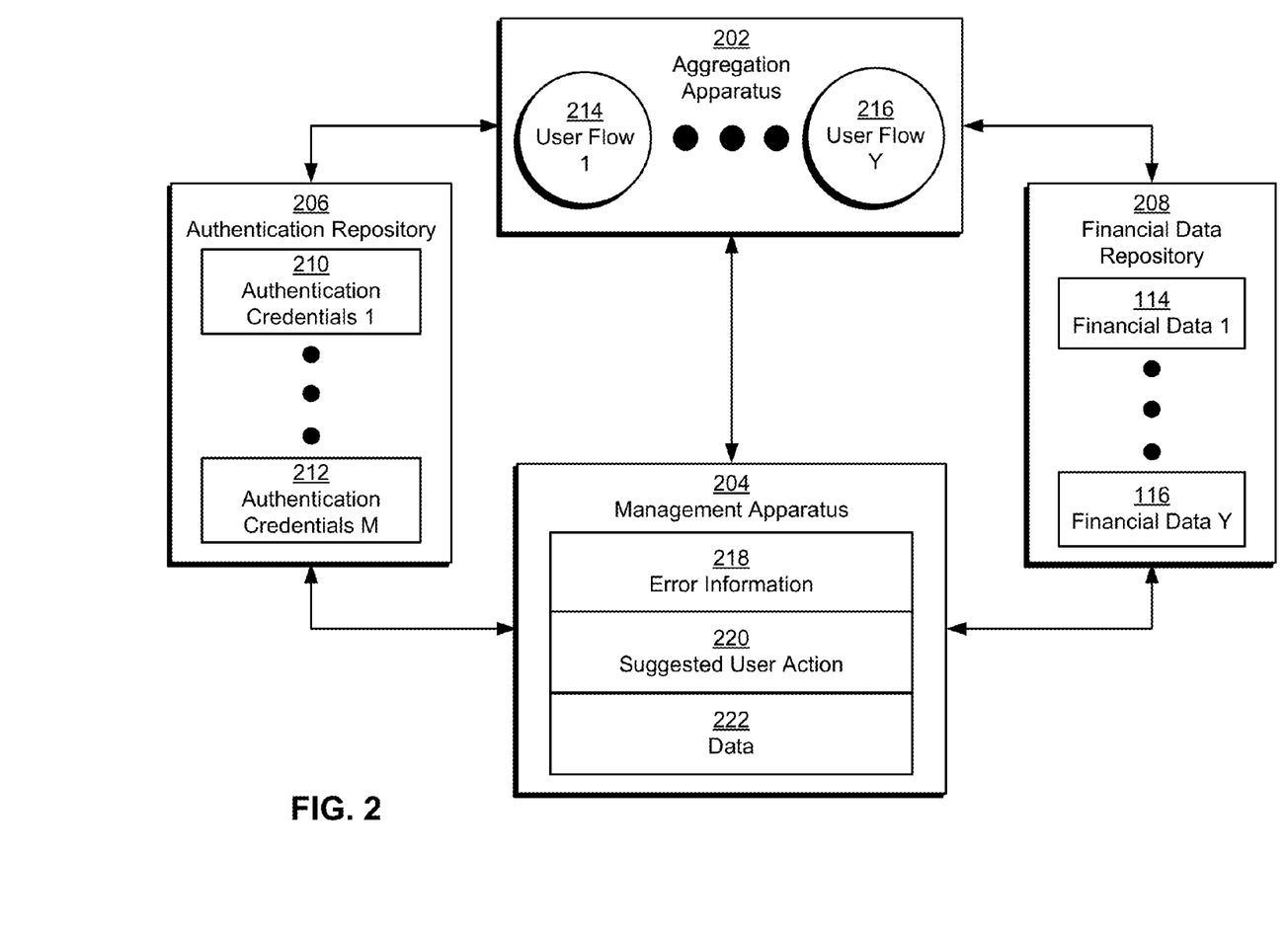
FIG. 2 shows a system for managing access to an online user account in accordance with the disclosed embodiments.

FIG. 2 shows a system for managing access to an online user account in accordance with the disclosed embodiments. The system may be a data-management system, such as data-management system 102 of FIG. 1. As shown in FIG. 2, the system includes an aggregation apparatus 202 and a management apparatus 204. Each of these components is described in further detail below.

Aggregation apparatus 202 may aggregate financial data (e.g., financial data 1 114, financial data y 116) from a number of online user accounts. As mentioned above, the online user accounts may be associated with financial institutions, government agencies, employers, merchants, and/or other providers of financial data. To aggregate the financial data, aggregation apparatus 202 may obtain stored authentication credentials (e.g., authentication credentials 1 210, authentication credentials m 212) for each online user account and use the authentication credentials to access the online user account. For example, aggregation apparatus 202 may obtain a username and password, biometric identifier, personal identification number (PIN), certificate, and/or other authentication credentials for the online user account from authentication repository 206 and use the authentication credentials to log in to the online user account as the user.

Authentication credentials in authentication repository 206 may be provided by the users and stored for subsequent use by the data-management system. For example, the users may provide authentication credentials for online banking accounts and/or other types of online user accounts during registration with the data-management system. The users may also add new authentication credentials to authentication repository 206 and/or modify existing credentials in authentication repository 206 during the addition and/or update of online user accounts within an offering that uses financial data aggregated by the data-management system.

Aggregation apparatus 202 may also use a set of predefined user flows (e.g., user flow 1 214, user flow y 216) for websites, web applications, and/or other web-based providers of the online user accounts to aggregate financial data (e.g., financial data 1 114, financial data y 116) from the online user accounts. Each user flow may identify a sequence and/or layout of user-interface elements, Uniform Resource Locators (URLs), web pages, files, and/or other attributes that may be used to navigate the online user accounts and aggregate financial data from the online user accounts. For example, aggregation apparatus 202 may use a user flow for a financial institution website to log in to a user's online banking account and navigate within the website to one or more web pages containing account information for the online banking account. Aggregation apparatus 202 may then scrape the account information from the web page(s) and store the account information, along with other financial data from other online user accounts, in a financial data repository 208.

However, aggregation apparatus 202 may encounter an error during aggregation of financial data from an online user account if the user flow for the online user account has changed. The error may include an authentication error, a connectivity error, a user flow error, and/or a financial data mismatch error. Aggregation apparatus 202 may experience a connectivity error if the online user account cannot be reached over a network. For example, the connectivity error may be caused by an unavailability of the website providing the online user account and/or the blocking of aggregation apparatus 202 by the website.

Aggregation apparatus 202 may experience an authentication error if the online user account cannot be accessed using the stored authentication credentials in authentication repository 206. For example, the authentication error may be encountered when the user is required to update his/her authentication credentials with the online user account and/or has updated the authentication credentials with the online user account without updating the stored authentication credentials in authentication repository 206.

A user flow error may represent an interruption to the predefined user flow for the online user account. For example, a user flow error may occur if the user is required to verify his/her contact information (e.g., email address, phone number, mailing address, etc.), accept new terms and conditions, update his/her communication preferences, and/or perform other user actions with the online user account before accessing the online user account.

A financial data mismatch error may occur if attributes of the financial data at the online user account do not match those at the data-management system. For example, the user may change a username, password, account name, account type, account number, transaction name, and/or transaction type in the online user account while accessing the online user account through a website. When aggregation apparatus 202 attempts to aggregate financial data from the online user account (e.g., during periodic batch aggregation of financial data from multiple user accounts), aggregation apparatus 202 may be unable to match the attributes in previously aggregated financial data with financial data scraped from the online user account.

To facilitate efficient resolution of an error associated with aggregating financial data from the online user account, aggregation apparatus 202 may obtain error information 218 describing the error from a web page associated with the error. For example, aggregation apparatus 202 may identify the web page as the web page that triggers the error and/or otherwise does not conform to the predefined user flow for the online user account. Aggregation apparatus 202 may store a HyperText Markup Language (HTML) file and/or other file containing the content of the web page in financial data repository 208 and/or another repository and set a flag indicating an error with the online user account.

Next, management apparatus 204 may perform a number of steps to guide the resolution of the error by the user. Management apparatus 204 may be accessed by the user during use of an offering that uses aggregated data from aggregation apparatus 202. For example, management apparatus 204 may provide a widget and/or other feature that is included in the offering and provides assistance with troubleshooting problems with connecting to and/or aggregating data from online user accounts.

First, management apparatus 204 may display error information 218 to the user. For example, management apparatus 204 may show a screenshot of the web page containing error information 218 to the user. Management apparatus 204 may also use the stored authentication credentials for the online user account to automatically navigate the user to the web page containing error information 218. For example, management apparatus 204 may provide a link that takes the user to the web page in an external browser, or management apparatus 204 may display the web page within an embedded window or screen in lieu of the screenshot. By navigating to the web page, management apparatus 204 may provide the user with the context and/or source of the error, as well as a mechanism for resolving the error without having to locate the error within the online user account.

Next, management apparatus 204 may analyze error information 218 to determine an error code associated with the error and provide a suggested user action 220 for resolving the error based on the error code. For example, management apparatus 204 may analyze error information 218 to identify keywords, user-interface elements, and/or other attributes associated with a given type of error code. If error information 218 is matched to an error code, management apparatus 204 may display suggested user action 220 for the error code to assist the user with remedial action for the error. If error information 218 is not matched to an error code, management apparatus 204 may assign a default error code to the error and display suggested user action 220 for the default error code. For example, management apparatus 204 may request that the user try to identify and/or resolve the error by viewing and/or interacting with the web page associated with the error.

Management apparatus 204 may additionally obtain data 222 for performing suggested user action 220 and use data 222 to automatically resolve the error on behalf of the user. For example, management apparatus 204 may resolve an authentication error by obtaining updated authentication credentials (e.g., username and/or password, answers to security questions, etc.) from the user and verifying that the online user account can be accessed using the updated authentication credentials. If management apparatus 204 is able to resolve the error using data 222, the user may not be required to navigate to the web page and/or perform additional user actions within the web page.

If data 222 is related to authentication credentials for the online user account, management apparatus 204 may include data 222 in authentication credentials stored in authentication repository 206 to facilitate subsequent access to the online user account using the stored authentication credentials. For example, management apparatus 204 may store new authentication credentials for the online user account in authentication repository 206 after verifying that the updated authentication credentials can be used to access the online user account. The operation of management apparatus 204 is described in further detail below with respect to FIGS. 3A-3E.

By providing error information 218 and suggested user action 220 and/or obtaining data 222 associated with an error encountered during aggregation of financial data, the system of FIG. 2 may reduce the amount of time and effort required by the user to resolve the error. For example, aggregation apparatus 202 and management apparatus 204 may allow the user to quickly identify the error within a web page, provide data 222 for resolving the error, and/or interact with the web page to resolve the error. In turn, aggregation apparatus 202 and management apparatus 204 may reduce the use of customer support, help forums, and/or other tedious and/or costly mechanisms for resolving the error, thus improving the user experience with the offerings.

Those skilled in the art will appreciate that the system of FIG. 2 may be implemented in a variety of ways. For example, aggregation apparatus 202, management apparatus 204, authentication repository 206, and financial data repository 208 may be provided by a single physical machine, multiple computer systems, one or more virtual machines, a grid, one or more databases, one or more file systems, and/or a cloud computing system. Aggregation apparatus 202 and management apparatus 204 may additionally be implemented together and/or separately by one or more hardware and/or software components and/or layers.

Figure 3A:
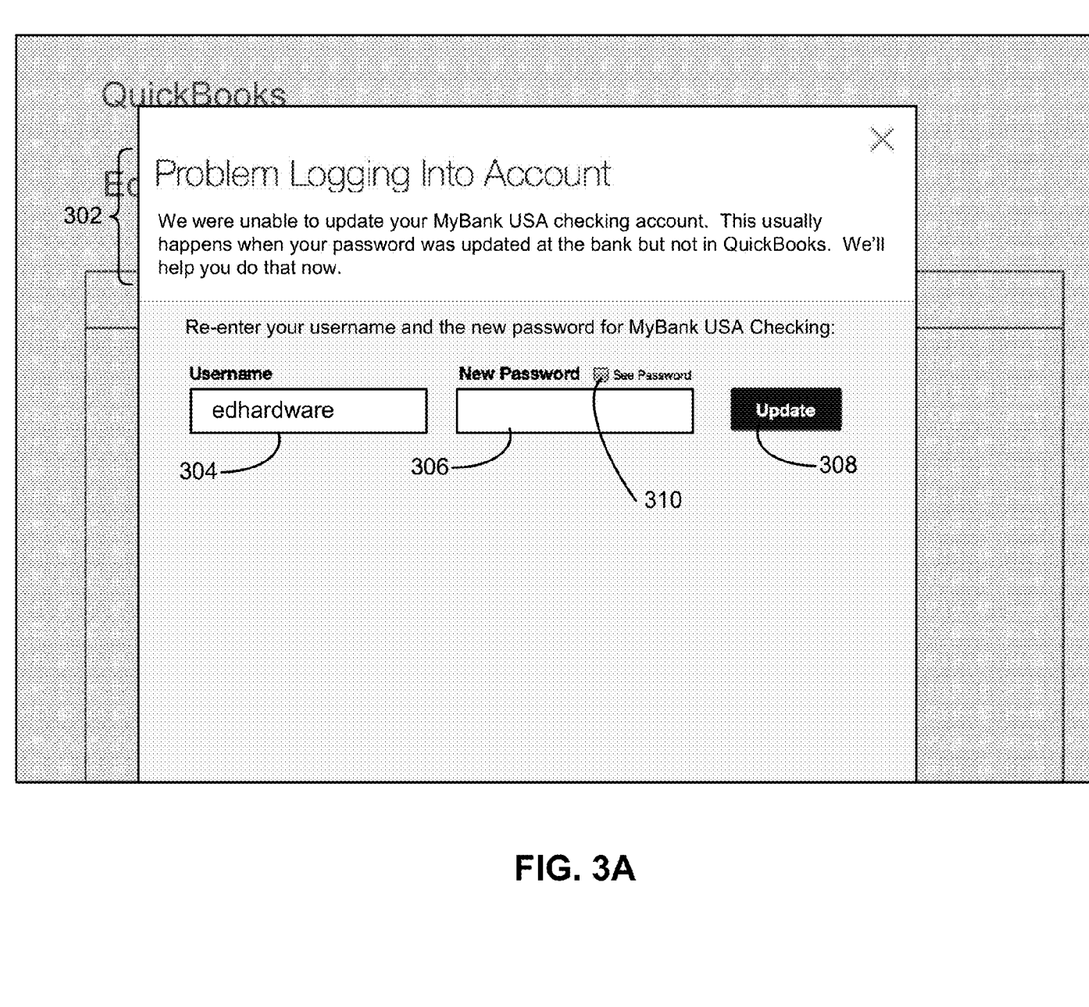
FIG. 3A shows an exemplary screenshot in accordance with the disclosed embodiments.

FIG. 3A shows an exemplary screenshot in accordance with the disclosed embodiments. More specifically, FIG. 3A shows a screenshot of a user interface provided by a management apparatus, such as management apparatus 204 of FIG. 2. The management apparatus may provide a widget and/or other feature that can be accessed within an offering such as an accounting application, financial-management application, and/or tax-preparation application.

As mentioned above, the management apparatus may assist a user with an error encountered during aggregation of financial data from an online user account of the user. As shown in FIG. 3A, the management apparatus may provide an overlay within the user interface of the offering. Within the overlay, the management apparatus may display a message 302 related to the error. Message 302 may identify the error (e.g., "Problem Logging Into Account") and provide additional detail related to the error, such as the name of the online user account (e.g., "MyBank USA checking account") and a possible cause of the error (e.g., "This usually happens when your password was updated at the bank but not in QuickBooks."). As a result, message 302 may describe an authentication error, in which aggregation of financial data from the online user account is prevented because stored authentication credentials for the online user account cannot be used to access the online user account.

The management apparatus may obtain data for resolving the error from the user. Within the user interface, the management apparatus may include user-interface elements 304-306 (e.g., text boxes) for entering a username and password for the online user account. The user interface may also include a user-interface element 308 (e.g., "Update") for submitting data entered in user-interface elements 304-306, as well as a user-interface element 310 (e.g., a checkbox) for showing the password in user-interface element 306. By selecting user-interface element 310, the user may verify that the password entered in user-interface element 306 is the correct password for the online user account.

Figure 3B:
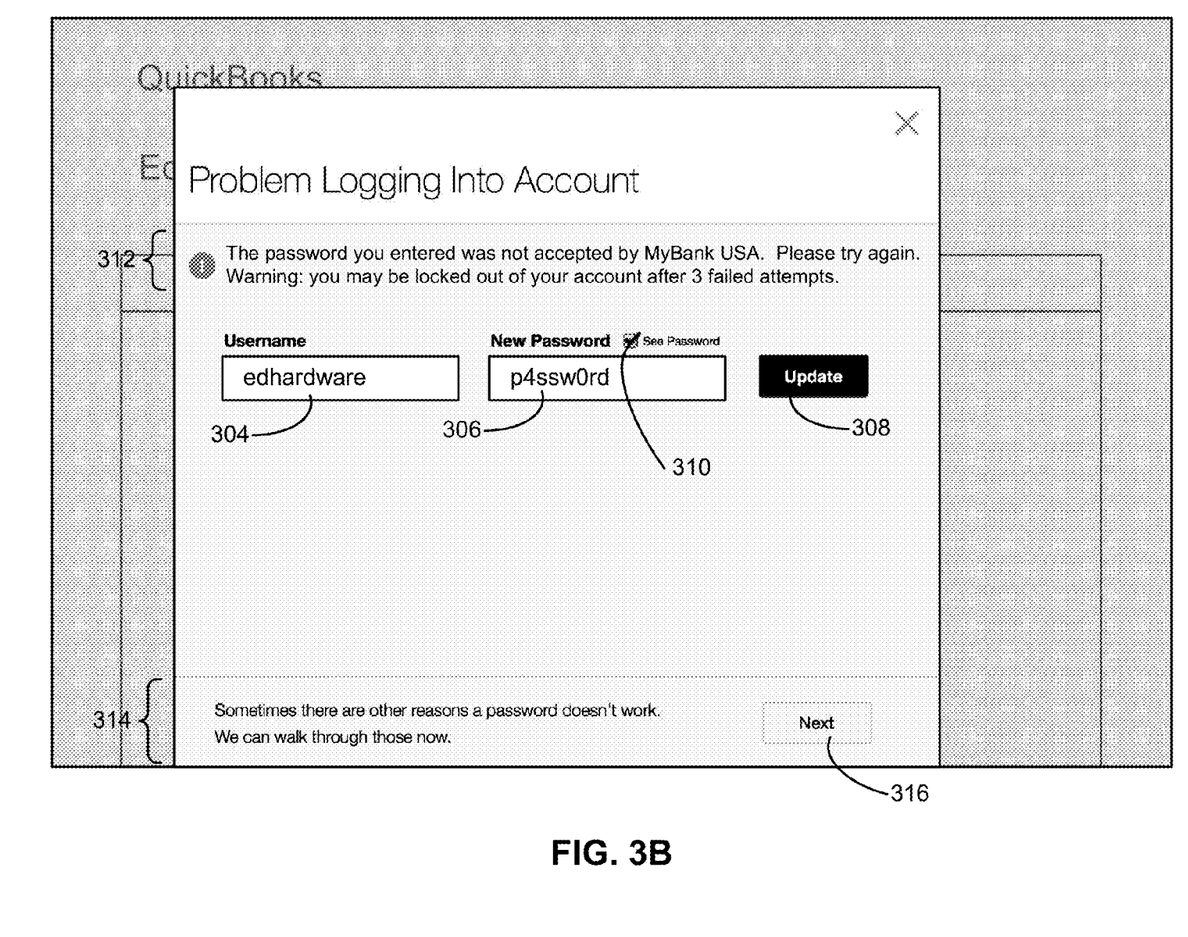
FIG. 3B shows an exemplary screenshot in accordance with the disclosed embodiments.

FIG. 3B shows an exemplary screenshot in accordance with the disclosed embodiments. In particular, FIG. 3B shows the user interface of FIG. 3A after the user has attempted to submit valid authentication credentials in user-interface elements 304-306. Within the user interface, the management apparatus may display a message 312 (e.g., "The password you entered was not accepted by MyBank USA. Please try again."). Message 312 may inform the user that the authentication error was not resolved using the username and password entered in the user interface of FIG. 3A and prompt the user to try again. To assist the user with entry of the password, user-interface element 310 may be automatically selected so that the password in user-interface element 306 is shown in plain text.

The user interface of FIG. 3B also includes a second message 314 (e.g., "Sometimes there are other reasons a password doesn't work. We can walk through those now.") and a user-interface element 316 associated with message 314. Message 314 may notify the user of other options for resolving the authentication error, and user-interface element 316 may be selected by the user to access those options.

Figure 3C:
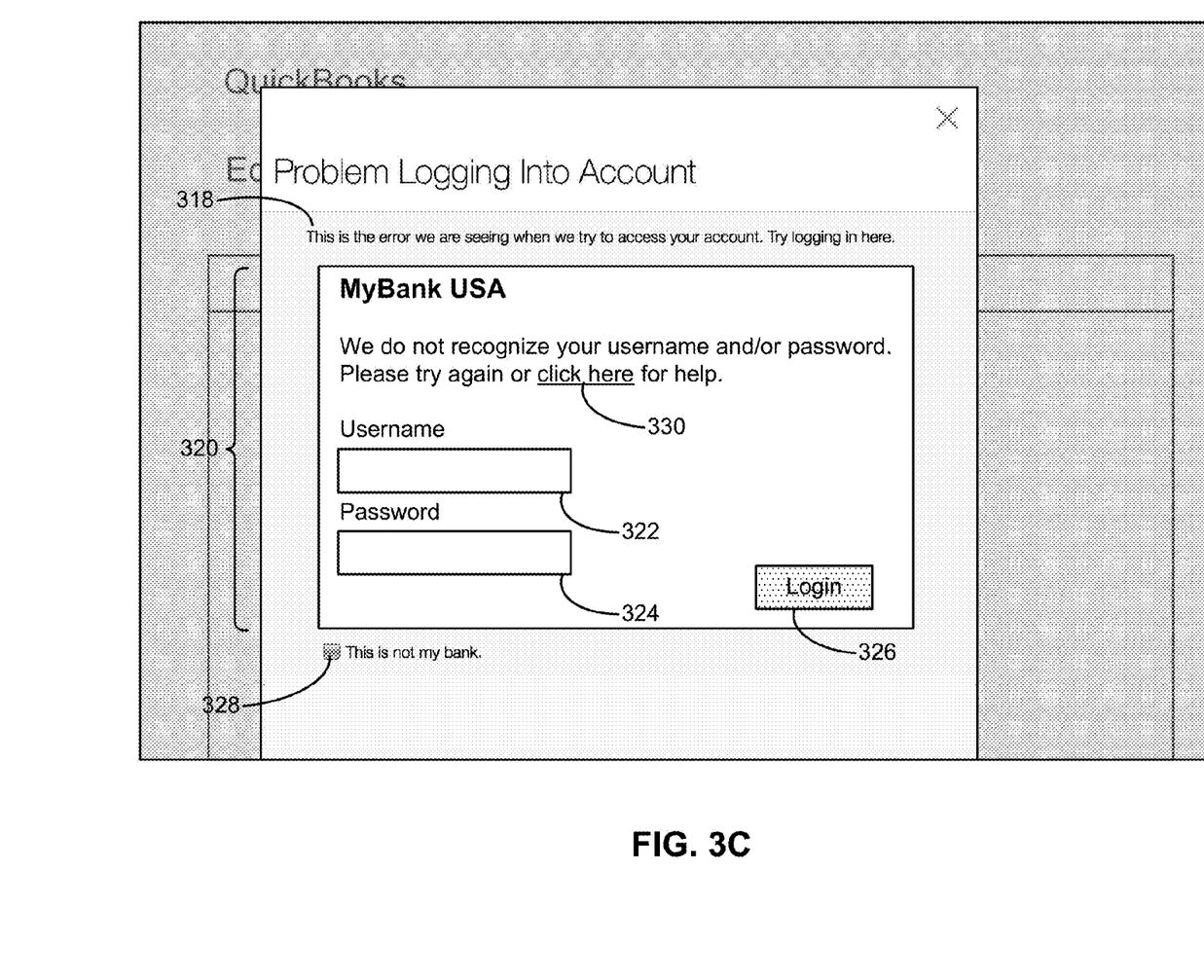
FIG. 3C shows an exemplary screenshot in accordance with the disclosed embodiments.

FIG. 3C shows an exemplary screenshot in accordance with the disclosed embodiments. More specifically, FIG. 3C shows the user interface of FIG. 3B after the user has selected user-interface element 316. Within the user interface, the management apparatus may show a message 318 (e.g., "This is the error we are seeing when we try to access your account. Try logging in here."), as well as a screen 320 containing error information describing the error. For example, screen 320 may provide a screenshot and/or embedded web page containing the error, and message 318 may describe the contents of screen 320 and instruct the user to attempt to authenticate within screen 320.

The user may use screen 320 to identify the cause of the error and/or resolve the error. For example, the user may compare the name of the financial institution (e.g., "MyBank USA") shown in screen 320 with the name of the user's financial institution. If the names do not match, the user may select a user-interface element 328 to communicate the mismatch to the management apparatus.

The user may also attempt to authenticate with the online user account within screen 320. For example, the user may enter his/her username and password in two user-interface elements 322-324 and select a third user-interface element 326 (e.g., "Login") to submit the username and password. Screen 320 may then update with the result of the authentication attempt, and the user may use the update in screen 320 to further diagnose and/or resolve the error.

The user may also select a link 330 (e.g., "click here") in the web page to navigate to a different web page that assists the user with resolving the error from the website of the online user account. For example, the user may select link 330 to navigate to a web page that allows the user to reset and/or retrieve his/her password for the online user account.

Figure 3D:
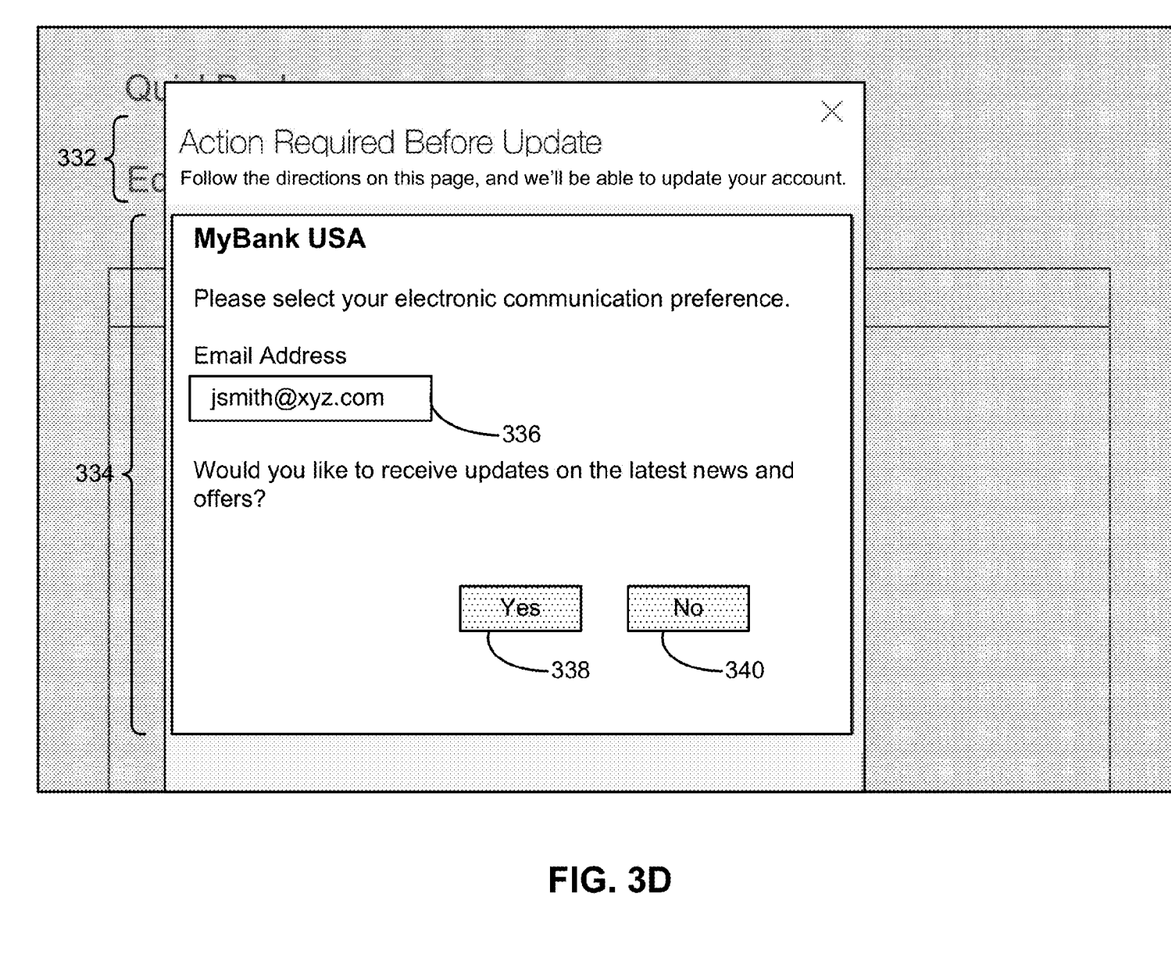
FIG. 3D shows an exemplary screenshot in accordance with the disclosed embodiments.

FIG. 3D shows an exemplary screenshot in accordance with the disclosed embodiments. As with FIGS. 3A-3C, FIG. 3D shows a screenshot of a user interface provided by a management apparatus, such as management apparatus 204 of FIG. 2. Within the user interface, the management apparatus may display a message 332. Message 332 may identify the error (e.g., "Action Required Before Update") associated with aggregating financial data from an online user account and suggest a user action for resolving the error (e.g., "Follow the directions on this page, and we'll be able to update your account."). For example, message 332 may notify the user of a user flow error, in which a web page that is not associated with the normal user flow for the online user account is encountered. In addition, message 332 may include a suggested user action for a default error because the error cannot be matched to a known error code using error information from the web page.

The user interface of FIG. 3D also includes a screen 334 that displays the content of the web page. As with screen 320 of FIG. 3C, screen 334 may embed the web page in the user interface so that the user may interact with the web page through screen 334. For example, the user may use the content shown within screen 334 to determine that the user is required to update his/her communication preferences (e.g., "Please select your electronic communication preference.") before accessing the online user account.

The user may also interact with the web page within screen 334 to resolve the error. For example, the user may enter and/or verify his/her email address (e.g., "jsmith@xyz.com") using a user-interface element 336. The user may then select a user-interface element 338 (e.g., "Yes") to update his/her communication preferences so that he/she receives email updates for news and offers related to the online user account. Conversely, the user may select a different user-interface element 340 (e.g., "No") to update his/her communication preferences so that he/she does not receive email updates for news and offers related to the online user account. Once the user has completed the action required to resolve the error, aggregation of data from the online user account may resume.

Figure 3E:
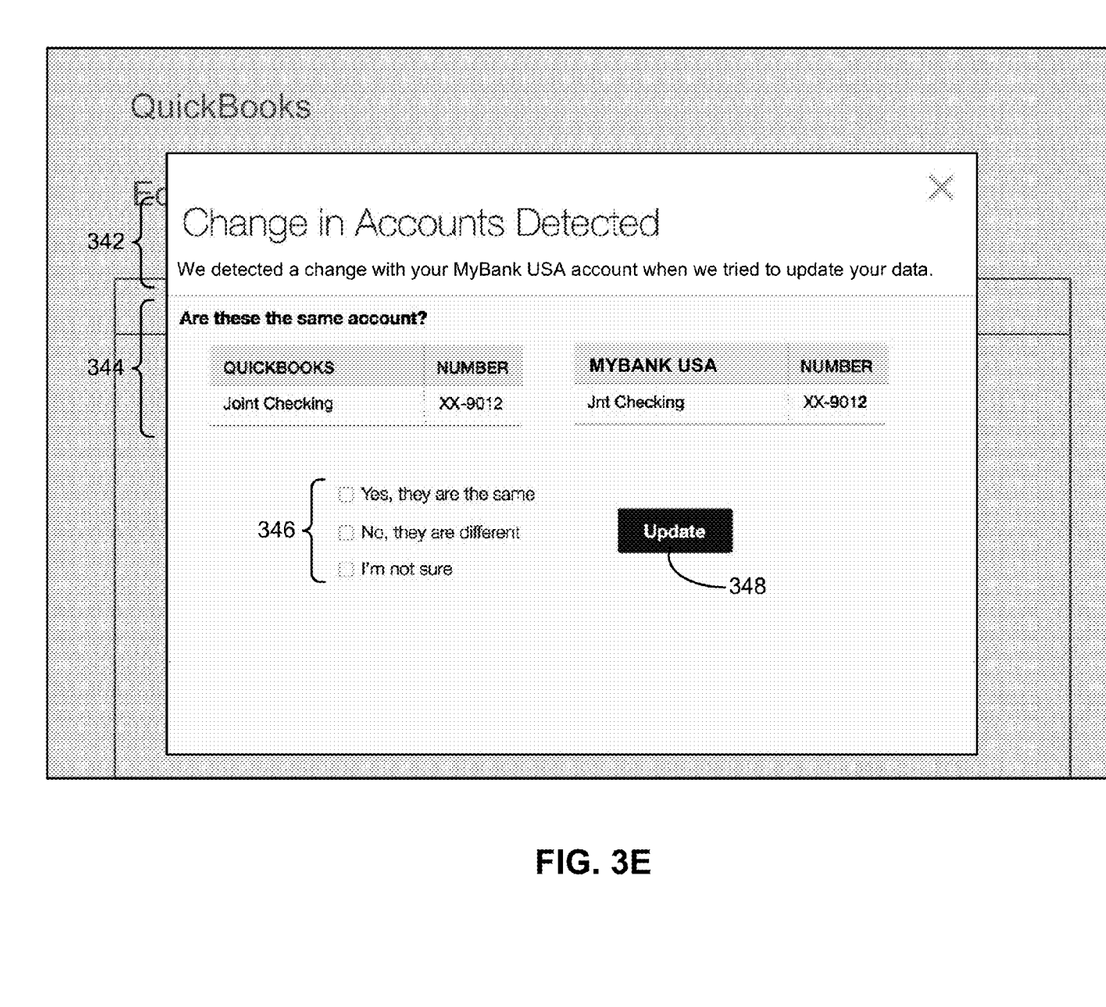
FIG. 3E shows an exemplary screenshot in accordance with the disclosed embodiments.

FIG. 3E shows an exemplary screenshot in accordance with the disclosed embodiments. In particular, FIG. 3E shows a screenshot of a user interface provided by a management apparatus, such as management apparatus 204 of FIG. 2. The user interface of FIG. 3E includes a message 342 related to an error associated with aggregating data from an online user account. Message 342 may identify the error (e.g., "Change in Accounts Detected") and provide a description of the error (e.g., "We detected a change with your MyBank USA account when we tried to update your data."). Message 342 may thus inform the user of a financial data mismatch error, in which one or more attributes of financial data aggregated from the online user account do not match previously aggregated versions of the attributes.

The user interface of FIG. 3E also includes information 344 that identifies the financial data mismatch. For example, information 344 may show the names and partially hidden account numbers for two records of bank accounts at a bank (e.g., "MYBANK USA") and an offering (e.g., "QUICK-BOOKS") used to access financial data aggregated from the bank. The user may compare the values in information 344 and select one of a set of options 346 for resolving the error. For example, the user may select a first checkbox to indicate that the accounts identified by information 434 are the same, a second checkbox to indicate that the accounts are different, and a third checkbox to indicate that the user is not sure if the accounts are the same or different.

The user may then select a user-interface element 348 (e.g., "Update") to submit the selection, and the management apparatus may update the financial data accordingly. For example, if the user indicates that both account names represent the same account, the management apparatus may merge records associated with both account names (e.g., "Joint Checking" and "Jnt Checking") and the same account number (e.g., "XX-9012") in aggregated financial data for the online user account. The management apparatus may also associate the records with both account names or update the records with the account name from the bank so that subsequent aggregation of financial data for the account proceeds without triggering the same financial data mismatch error. If the user indicates that the account names represent separate accounts, the management apparatus may store records containing the two account names and account numbers under separate representations of the accounts. If the user indicates that he/she is unsure if the accounts are the same or not, the management apparatus may perform a default action (e.g., keeping the accounts separate) and/or provide further assistance in determining if the accounts are the same or different.

Figure 4:
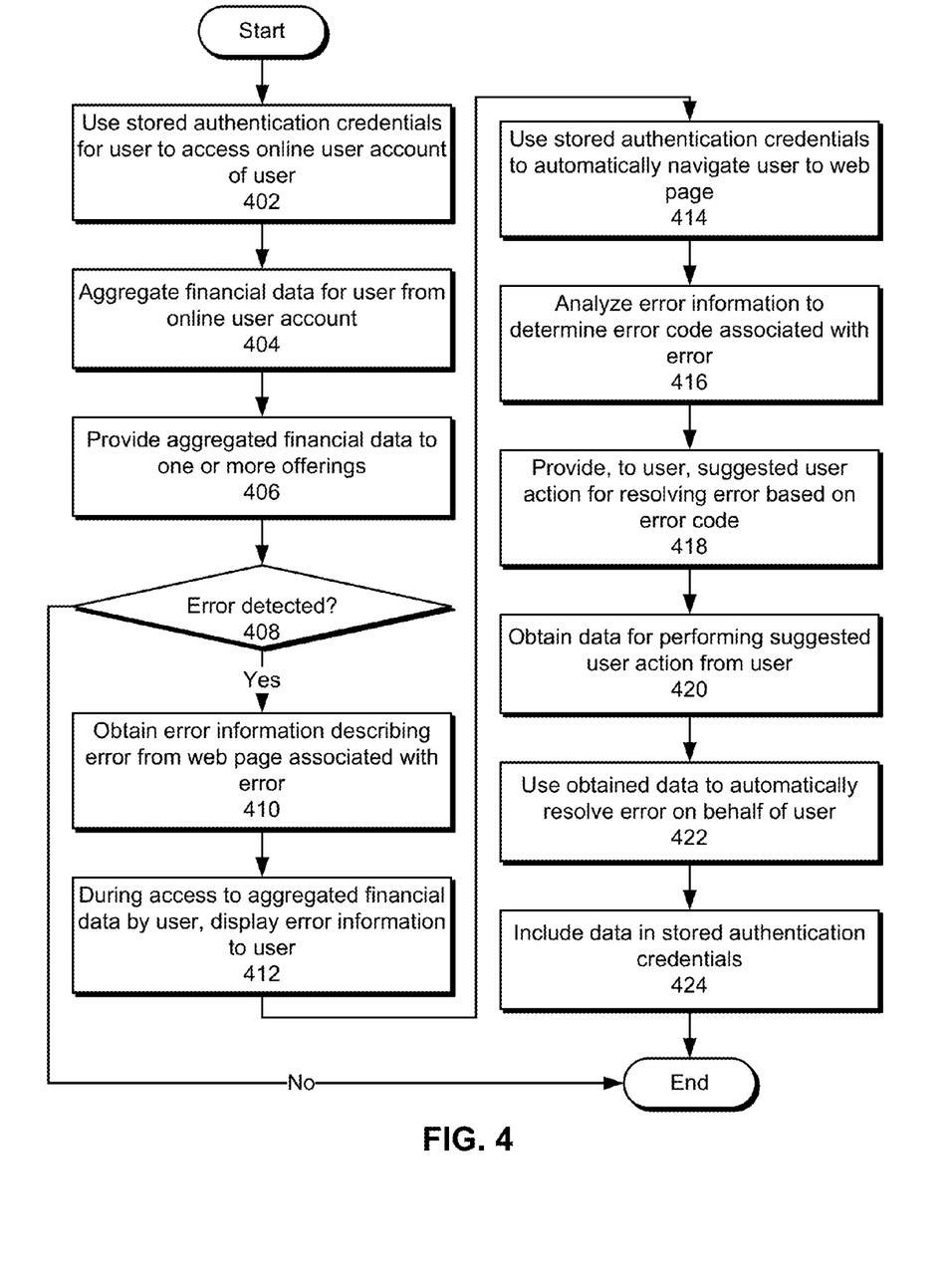
FIG. 4 shows a flowchart illustrating the process of managing access to an online user account in accordance with the disclosed embodiments.

FIG. 4 shows a flowchart illustrating the process of managing access to an online user account in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, stored authentication credentials for a user are used to access the online user account of the user (operation 402). The authentication credentials may be obtained from the user during configuration of an offering and/or data-management system (e.g., data-management system 102 of FIG. 1) that are used to aggregate financial data from the online user account. For example, the user may provide the authentication credentials to the offering and/or data-management system to enable use of financial data associated with the online user account by the offering.

Next, financial data for the user is aggregated from the online user account (operation 404). For example, a batch process may periodically aggregate financial data from user accounts of multiple users independently of access to the aggregated financial data by the users, or the financial data may be aggregated on demand (e.g., when a user refreshes the financial data within an offering). During aggregation of the financial data, a predefined user flow may be used to navigate to one or more web pages containing the financial data, and the financial data may be scraped from the web page(s).

The aggregated financial data may also be provided to one or more offerings (operation 406). The offering(s) may be web applications, native applications, mobile application, and/or other software offerings that perform tasks using the aggregated financial data. For example, the offering(s) may allow the user to file taxes, manage finances, create a budget, run payroll, and/or pay bills.

An error associated with aggregating the financial data may be detected (operation 408). The error may interfere with the aggregation of the financial data from the online user account. For example, the error may be an authentication error, connectivity error, user flow error, and/or financial data mismatch error. If no error is detected, the financial data may be aggregated and provided to the user during subsequent access to the financial data by the user (e.g., through an offering).

If an error associated with aggregating the financial data is discovered, error information describing the error is obtained from a web page associated with the error (operation 410) and displayed to the user during access to the aggregated financial data by the user (operation 412). For example, an HTML dump of the web page may be obtained during access to the online user account in operation 402, and a screenshot of the HTML dump may be shown to the user within a user interface of the offering. The displayed error information may provide context for the error that facilitates resolution of the error by the user.

The stored authentication credentials may also be used to automatically navigate the user to the web page (operation 414). For example, the web page may be shown within an embedded screen and/or window of the offering in lieu of a screenshot so that the user may interact with the web page without leaving the user interface of the offering. Alternatively, the user may navigate to the web page by selecting a link to the web page and using a web browser to view the web page.

In addition, the error information may be analyzed to determine an error code associated with the error (operation 416), and a suggested user action for resolving the error based on the error code may be provided to the user (operation 418). For example, the web page may be analyzed for a layout, keywords, user-interface elements, and/or other attributes that match a given error code. If a match is found, the suggested user action for the error code may be shown to the user. If no match is found, a default error code and suggested user action may be used.

Data for performing the suggested user action may also be obtained (operation 420) and used to automatically resolve the error on behalf of the user (operation 422). For example, data for resolving a financial data mismatch error may be obtained within the user interface of the offering and used to update the aggregated financial data without requiring the user to access the online user account and/or manually change values in all records of the aggregated financial data. If the data includes authentication credentials for the online user account, the data is also included in the stored authentication credentials (operation 424) to facilitate subsequent access to the online user account using the stored authentication credentials.

Figure 5:
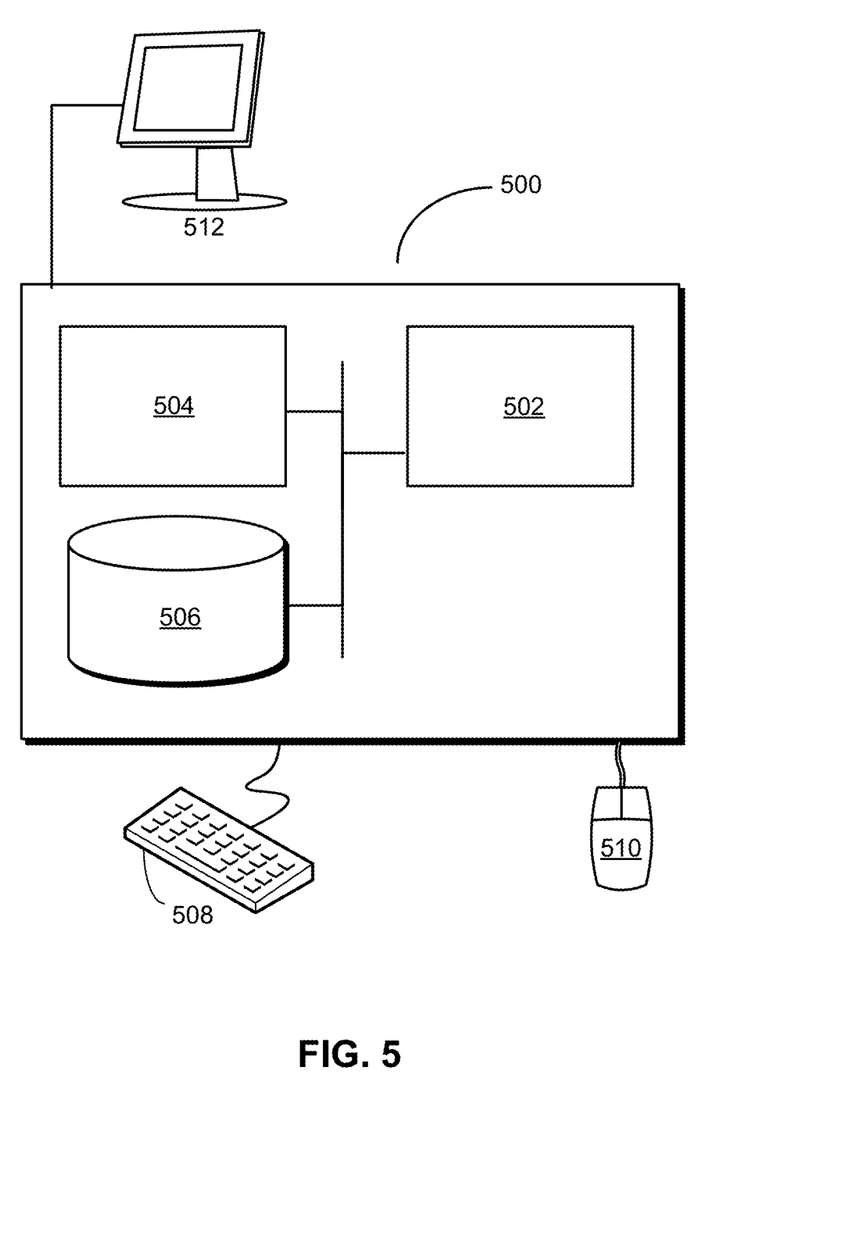
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for managing access to an online user account. The system may include an aggregation apparatus and a management apparatus. The aggregation apparatus may use stored authentication credentials for a user to access the online user account of the user and aggregate financial data for the user from the online user account. Upon detecting an error associated with aggregating the financial data, the aggregation apparatus and/or management apparatus may obtain error information describing the error from a web page associated with the error. When the user accesses the aggregated financial data, the management apparatus may display the error information to the user to facilitate resolution of the error by the user.

In addition, one or more components of computer system 500 may be remotely located and connected to the other components over a network. Portions of the present embodiments (e.g., aggregation apparatus, management apparatus, offerings, etc.) may also be located on different nodes of a distributed system that implements the embodiments. For example, the present embodiments may be implemented using a cloud-computing system that aggregates financial data from online user accounts of a set of remote users and provides the aggregated financial data to one or more offerings used by the remote users.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:
1. A method for managing access to an online user account, comprising:
    using stored authentication credentials for a user to obtain access to the online user account of the user;
    upon obtaining access to the online user account, aggregating financial data for the user from the online user account; and
    upon detecting an error associated with aggregating the financial data, processing the error by performing the following operations on a computer system:
        obtaining error information describing the error from a web page associated with the error, and
        when the user subsequently accesses the aggregated financial data, displaying the error information to the user to facilitate resolution of the error by the user.

2. The method of claim 1, further comprising:
    analyzing the error information to determine an error code associated with the error; and
    providing, to the user, a suggested user action for resolving the error based on the error code.

3. The method of claim 2, further comprising:
    obtaining, from the user, data for performing the suggested user action; and
    using the obtained data to automatically resolve the error on behalf of the user.

4. The method of claim 3, further comprising:
    including the data in the stored authentication credentials to facilitate subsequent access to the online user account using the stored authentication credentials.

5. The method of claim 1, further comprising:
    using the stored authentication credentials to automatically navigate the user to the web page containing the error information.

6. The method of claim 1, further comprising:
    providing the aggregated financial data to one or more offerings that perform tasks using the aggregated financial data, wherein the one or more offerings are used by the user to access the aggregated financial data.

7. The method of claim 1, wherein the error is at least one of:
    an authentication error;
    a connectivity error;
    a user flow error; and
    a financial data mismatch error.

8. The method of claim 1, wherein aggregating the financial data from the online user account comprises:
    scraping the financial data from one or more web pages obtained during access to the online user account.

9. The method of claim 1, wherein the financial data is aggregated independently of access to the aggregated financial data by the user.

10. The method of claim 1, wherein the error information is displayed within a screenshot of the web page to the user.

11. An apparatus, comprising:
    one or more processors; and
    memory storing instructions that, when executed by the one or more processors, cause the apparatus to:
        use stored authentication credentials for a user to obtain access to an online user account of the user,
        upon obtaining access to the online user account, aggregate financial data for the user from the online user account, and
        upon detecting an error associated with aggregating the financial data, process the error by:
            obtain error information describing the error from a web page associated with the error; and
            when the user subsequently accesses the aggregated financial data, display the error information to the user to facilitate resolution of the error by the user.

12. The apparatus of claim 11, wherein the memory further stores instructions that, when executed by the one or more processors, cause the apparatus to:
   analyze the error information to determine an error code associated with the error; and
   provide, to the user, a suggested user action for resolving the error based on the error code.

13. The apparatus of claim 12, wherein the memory further stores instructions that, when executed by the one or more processors, cause the apparatus to:
   obtain, from the user, data for performing the suggested user action; and
   use the obtained data to automatically resolve the error on behalf of the user.

14. The apparatus of claim 11, wherein the memory further stores instructions that, when executed by the one or more processors, cause the apparatus to:
   use the stored authentication credentials to automatically navigate the user to the web page containing the error information.

15. The apparatus of claim 11, wherein the memory further stores instructions that, when executed by the one or more processors, cause the apparatus to:
   provide the aggregated financial data to one or more offerings that perform tasks using the aggregated financial data, wherein the one or more offerings are used by the user to access the aggregated financial data.

16. The apparatus of claim 11, wherein the error is at least one of:
   an authentication error;
   a connectivity error;
   a user flow error; and
   a financial data mismatch error.

17. A non-transitory computer-readable storage medium storing instructions that when executed by a computer cause the computer to perform a method for managing access to an online user account, the method comprising:
   using stored authentication credentials for a user to obtain access to the online user account of the user;
   upon obtaining access to the online user account, aggregating financial data for the user from the online user account; and
   upon detecting an error associated with aggregating the financial data, processing the error by:
      obtaining error information describing the error from a web page associated with the error, and
      when the user subsequently accesses the aggregated financial data, displaying the error information to the user to facilitate resolution of the error by the user.

18. The non-transitory computer-readable storage medium of claim 17, the method further comprising:
   analyzing the error information to determine an error code associated with the error; and
   providing, to the user, a suggested user action for resolving the error based on the error code.

19. The non-transitory computer-readable storage medium of claim 18, the method further comprising:
   obtaining, from the user, data for performing the suggested user action; and
   using the obtained data to automatically resolve the error on behalf of the user.

20. The non-transitory computer-readable storage medium of claim 17, the method further comprising:
   using the stored authentication credentials to automatically navigate the user to the web page containing the error information.

* * * * *